United States Patent [19]

Renk

[11] Patent Number: 4,520,686
[45] Date of Patent: Jun. 4, 1985

[54] CONNECTING ELEMENT FOR GEARSHIFT LINKAGES

[75] Inventor: Rolf Renk, Ginsheim-Gustavsburg, Fed. Rep. of Germany

[73] Assignee: General Motors Corporation, Detroit, Mich.

[21] Appl. No.: 472,744

[22] Filed: Mar. 7, 1983

[30] Foreign Application Priority Data

Mar. 10, 1982 [DE] Fed. Rep. of Germany ....... 3208543

[51] Int. Cl.³ .............................................. G05G 9/18
[52] U.S. Cl. ..................................... 74/473 R; 74/470
[58] Field of Search ............. 74/524, 519, 523, 473 R, 74/470; 403/330, 107, 325; 180/328, 89.14

[56] References Cited

U.S. PATENT DOCUMENTS

| 1,881,843 | 10/1932 | Morley | 74/473 R |
| 3,406,586 | 10/1968 | Hobbins | 74/473 P |
| 4,323,356 | 4/1982 | Stephenson | 74/473 R |

FOREIGN PATENT DOCUMENTS

| 2658019 | 7/1978 | Fed. Rep. of Germany .... 74/473 R |
| 2270115 | 12/1975 | France .............................. 180/89.14 |
| 178514 | 11/1982 | Japan .................................. 74/470 |

Primary Examiner—Gary L. Smith
Assistant Examiner—Adrian H. Whitcomb, Jr.
Attorney, Agent, or Firm—Donald F. Scherer

[57] ABSTRACT

A decoupling device is used for the purpose of establishing a selective connection between two rods, especially two gearshift rods disposed between the transmission and gearshift lever of a motor vehicle. This device permits forward and backward movement of the decoupled gearshift rod after the transmission has been shifted into a gear and reduces the noise and vibrations transmitted from the transmission to the gearshift linkage and the body. The decoupling device, which is particularly adapted for installation into the tubular casing surrounding the gearshift linkage, includes a spring-biased, pivotally mounted latch, which establishes the selective connection between the ends of the gearshift rods. The latch is attached to the end of the one gearshift rod and cooperates with a drive pin or a second latch disposed on the end of the other gearshift rod. Either a form-locking connection or a force-locking connection between the gearshift rod can be employed.

27 Claims, 14 Drawing Figures

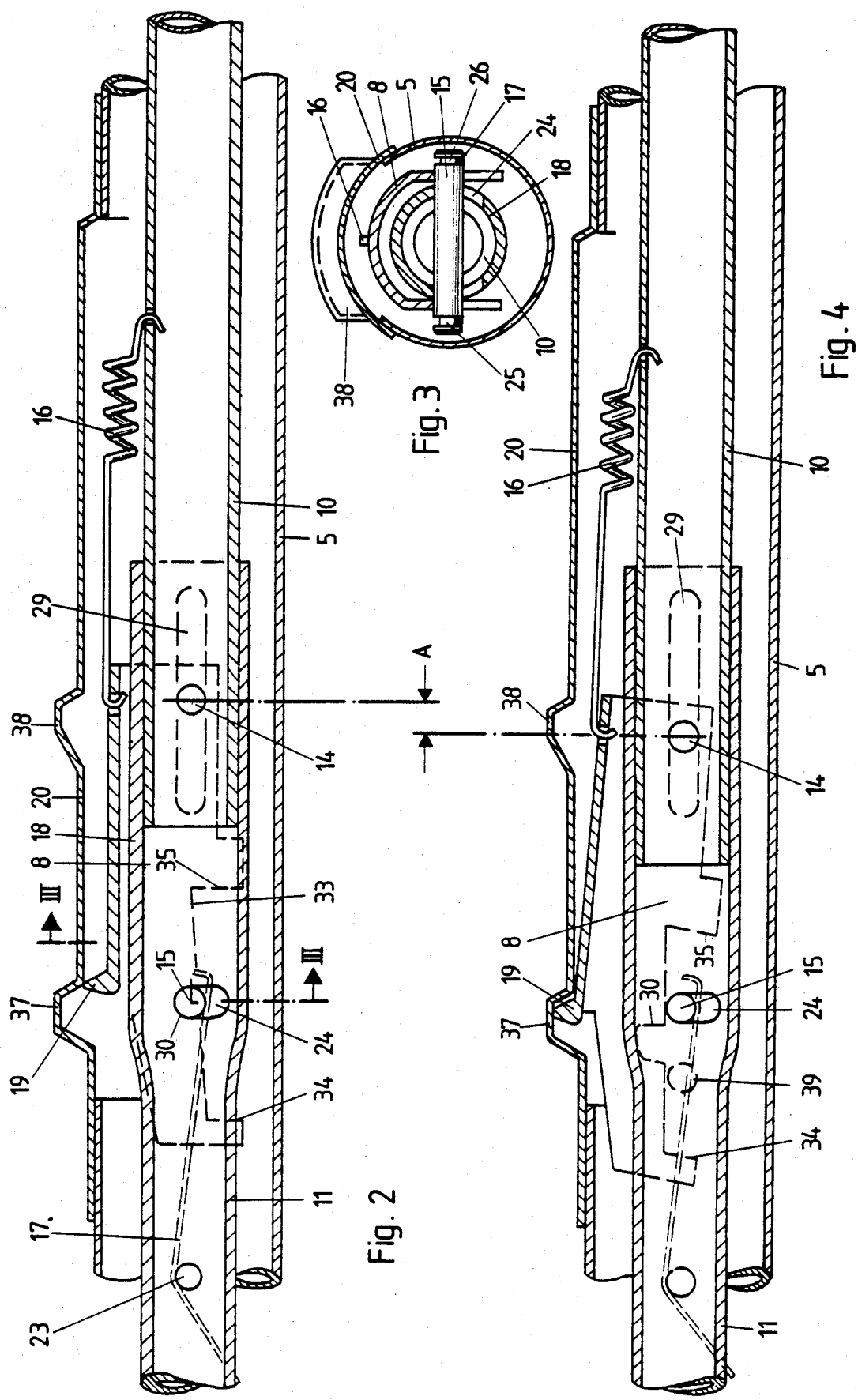

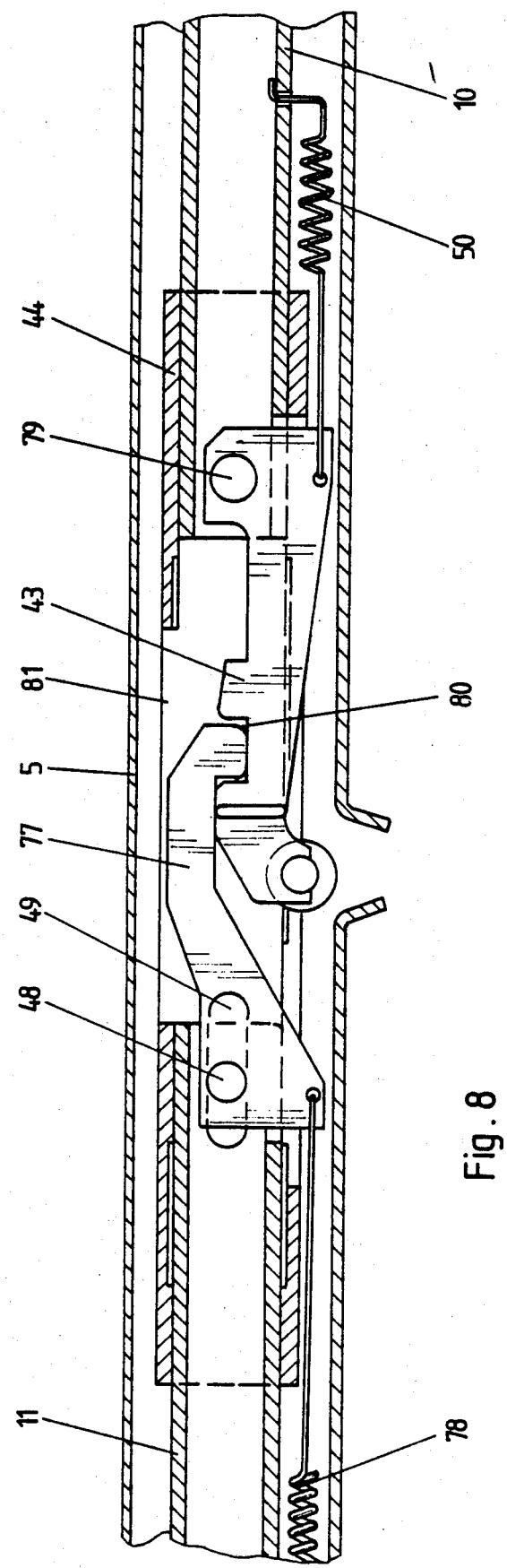
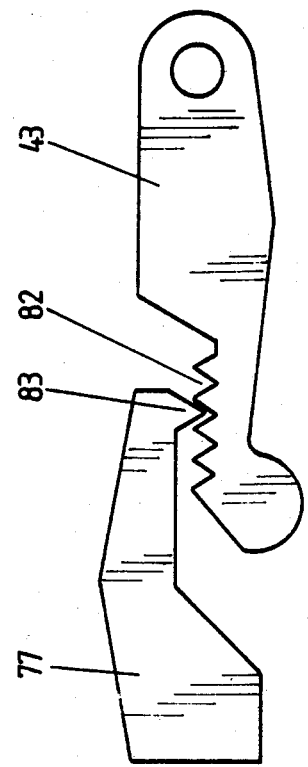
Fig. 8
Fig. 9

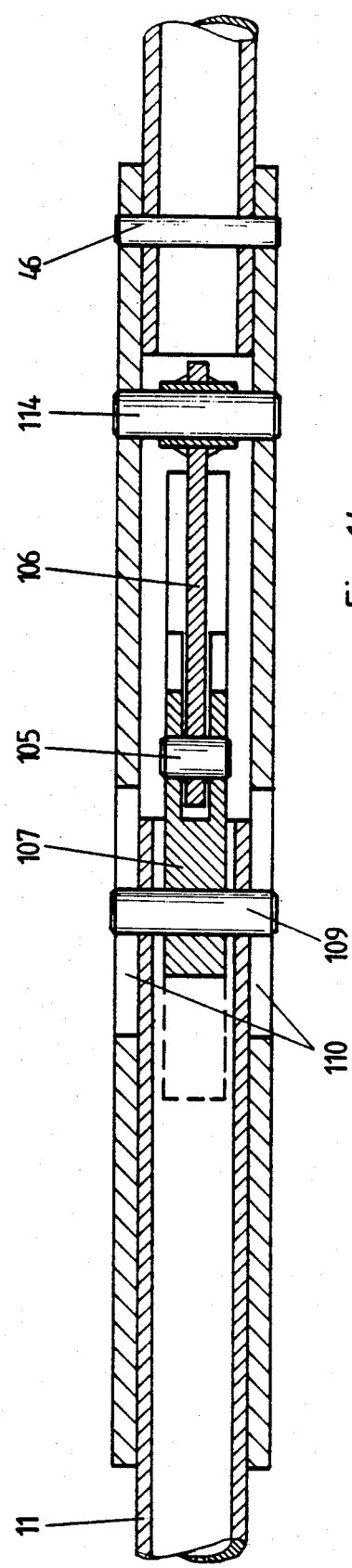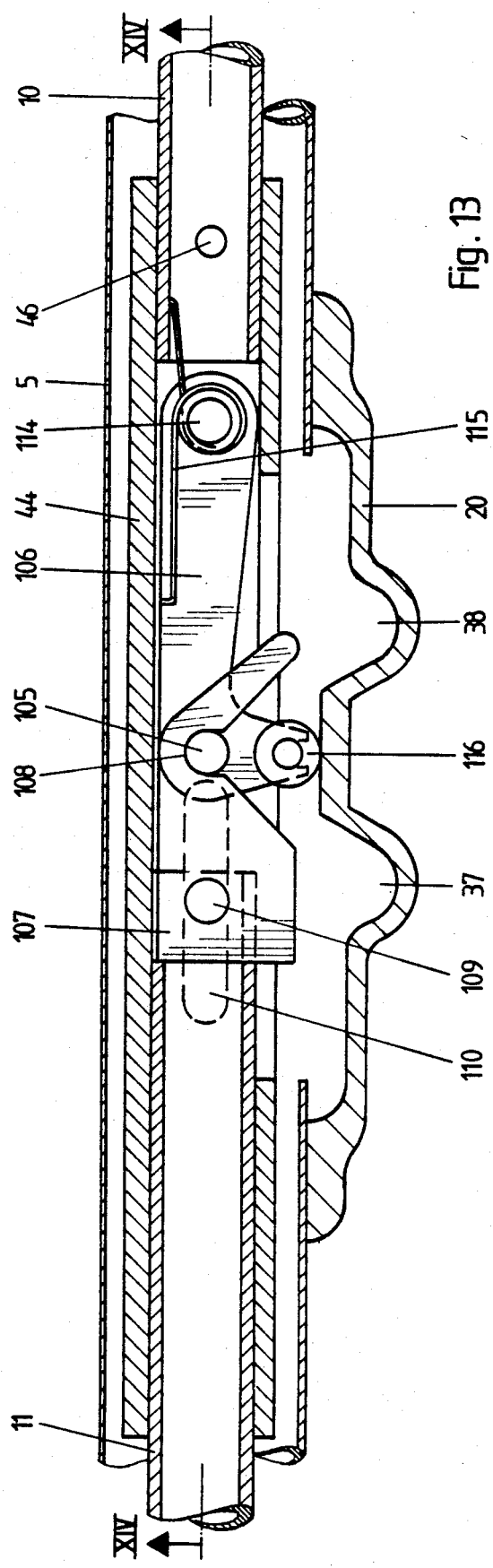

CONNECTING ELEMENT FOR GEARSHIFT LINKAGES

This invention relates to connecting elements for linkages, especially the linkage disposed between the transmission and gearshift lever of a motor vehicle, the connecting element being in the form of a decoupling device disposed between two gearshift rods and adapted to permit forward and backward movement of the decoupled gearshift rod after the transmission has been shifted into one of the gears.

For reasons of compactness, it is relatively common to have the engine/transmission unit disposed transversely relative to the longitudinal axis of the vehicle. However, one problem associated with this type of engine/transmission arrangement is that of gear jumping. Due to pavement-induced excitations and torque reactions generated by the engine, the engine transmission unit is subjected to rotary movements about its longitudinal axis, and vibrations are generated in the gearshift linkage to the extent that the drive unit and the gearshift linkage are caused to vibrate against each other. If the amplitudes of the vibrations thus generated are large enough, it may happen that the transmission is thrown out of gear.

The prior art discloses a connecting element for automotive gearshift linkages which includes a decoupling device. With the help of this decoupling device, it is possible to suspend the rigid connection that exists between the gearshift lever and the transmission when the vehicle is in gear, and to effect a form-locking connection between the two gearshift rods only when a gear is being selected (rotation of the gearshift rod) or when a gear is being put in or out of mesh (longitudinal displacement of gearshift rods). The provision of a means for disconnecting the gearshift lever and the transmission when the vehicle is in gear also has the advantage that noise and vibrations transmitted by the transmission to the gearshift linkage and the body are being reduced. However, this known connecting element is complex in structure and creates assembling problems, since it does not lend itself easily for installation into the tubular casing surrounding the gearshift rod.

Therefore, it is the object of the present invention to provide a decoupling device which is compact and relatively simple in structure, and which can be installed without difficulty into the tubular casing surrounding the gearshift rods. This objective is accomplished in accordance with the present invention in that the operative connection between the ends of the gearshift rods in engagement with one another is effected by way of a spring-loaded pivotable latch.

The decoupling device incorporating the novel latch means is simple in construction and can easily be installed into the existing tubular casing which is provided with a suitable opening and cover to facilitate installation. Due to the simplicity in assembly and the timesaving method of installation into the tubular casing, the decoupling device is eminently suitable for high-volume production.

In a further advantageous development of the invention, it is proposed that the latch be mounted at one end of a gearshift rod, that there be provided a drive pin mounted at one end of the other gearshift rod which is adapted to cooperate with the latch, and that the latch be provided with a cam which is adapted to engage into depressions of the tubular casing surrounding the gearshift rods or depressions provided in some other member rigidly connected to the body. Thus, the connection of the two gearshift rods is of the form-locking type. The gearshift rods may be in the form of tubes adapted for telescopic engagement into one another, and the pin for supporting the latch may be secured to the one tubular member and adapted to engage with its two ends into oppositely disposed longitudinal slots provided in the other tubular member, so that when a gear is being selected, the two tubular members are permitted to execute a rotary movement in unison. Preferably, the one tubular member is provided with a radially enlarged portion for insertion of the other tubular member The drive pin may be slidably mounted in a slot that is transversely disposed relative to the longitudinal axis of the tubular member and be retained in its initial position by a spring. This arrangement of the drive pin prevents jamming of the latch if, during shifting of the gears, the pin is not exactly aligned oppositely the recess provided in the latch for receiving said pin. If this should occur, the drive pin is being displaced by the latch and engages into the recess only when the pin has moved into alignment therewith. Preferably, the latch is provided with a bearing surface for the drive pin having two end surfaces and one recess. The depressions for the cam of the latch may be formed into an adjustable and fixable cover which is placed over an opening provided in the tubular casing.

In order that the two tubular members be of the same diameter, it may be suitable that the latch be pivotably mounted in a tubular member which serves as a coupling between the two ends of the tubular gearshift members, and to provide apertures in the one tubular gearshift member and in the tubular coupling so as to permit the latch to extend into the tubular casing. The tubular coupling member may be rigidly connected with the end of one tubular gearshift member by means of a pin, whereas the end of the other tubular gearshift member is disposed for longitudinal displacement in the tubular coupling and is provided with a transversely extending slot for the drive pin which is cooperating with the latch.

In order to effect alignment between the depressions or apertures and the cam or the roller of the latch, the cover for the tubular casing may be provided with oblong apertures for the fastening screws.

Instead of the drive pin, it is also possible to use a second latch, so that there will be a spring-loaded latch at the end of each tubular gearshift member, with both latches being disposed in the tubular coupling member and cooperating with one another. The first latch may be provided with toothing for engagement with a tooth or toothing provided on the second latch.

The coupling of the two tubular gearshift members may also be of the force-locking type, which may be effected in that the spring-loaded latch is mounted in the tubular coupling and in one tubular gearshift member, is extending into the tubular casing through apertures provided in the tubular coupling and the tubular gearshift member, and is provided with cams in the area of the pivot axis so as to be wedged into the tubular gearshift member and to thereby effect a force-locking connection between the two tubular gearshift members.

Finally, the drive pin may be secured to the latch for engagement with a conically enlarged recess of a catch means disposed at the end of one of the tubular gearshift members.

Additional features and advantages will become apparent from the drawings and the following specifications. Five exemplary embodiments of the invention are being illustrated in the drawings wherein:

FIG. 2 is a longitudinal sectional view of the decoupling device with the tubular gearshift members being coupled to one another;

FIG. 3 is a cross-sectional view along lines III—III of FIG. 2;

FIG. 4 is the decoupling device according to FIG. 2 in the decoupled state;

FIG. 8 is a longitudinal cross-sectional view of a third embodiment of a decoupling device having two cooperating latches;

FIG. 9 is a view of the two latches according to FIG. 8 illustrating the latches in the form of intermeshing toothing;

FIG. 13 is a longitudinal cross-sectional view of a further embodiment of the decoupling device in which a drive pin is secured to the latch; and FIG. 14 is a cross-sectional view along line XIV—XIV of FIG. 13.

Figure 1:
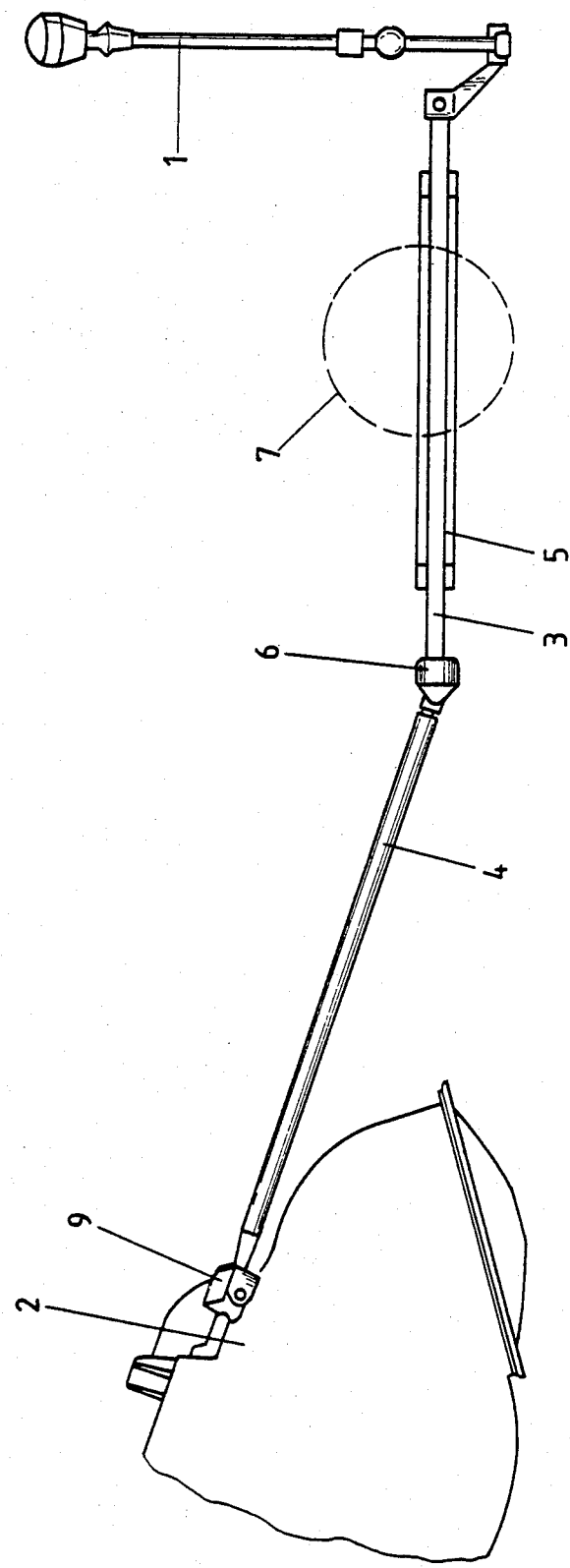
FIG. 1 is a gearshift linkage including a tubular casing for installation of the novel decoupling device.

FIG. 1 illustrates a gearshift lever 1 and a transmission block 2 of a motor vehicle as well as the associated gearshift rods 3 and 4. The gearshift rod 3 connected with the gearshift lever 1 is surrounded by a tubular casing 5 and is provided at its forward end with a universal joint 6 to establish a connection with the gearshift rod 4 which itself is connected with the transmission block through a further universal joint 9. The universal joints 6 and 9 are provided with elastic inserts. The decoupling device is disposed in the tubular casing 5 in the area of the circle 7 indicated by broken lines.

The decoupling device illustrated in FIGS. 2 to 4 is comprised of the pivotable latch 8 which, when in the locked position according to FIG. 2, establishes an operative connection between the ends of the tubular gearshift rods 10 and 11, the two pins 14 and 15 as well as the extension spring 16 and the leg spring 17. The tubular members 10 and 11 are inserted with their respective ends into one another for relative longitudinal displacement. For this purpose, the tubular member 11 associated with the transmission 2 may be provided either with a larger diameter than the tubular member 10 associated with the gearshift lever 1, or it may have a radially enlarged portion 18 for receiving the end of the tubular member 10. The extension spring 16 attached to the tubular member 10 acts on the latch 8 and urges the cam 19 against the cover 20 of the tubular casing 5. The leg spring 17 is bracing itself with its one end against the tubular member 11 and against a pin 23 secured in the tubular member 11 and provided with grooves for the legs of spring 17, and its two free legs are engaging the pin 15 from below, said pin 15 being slidably disposed in a transverse slot 24 in the tubular member 11 and being provided at its two ends with grooves 25 and 26 for the legs of the leg spring 17 so as to facilitate centering.

The pin 14 fastened to the tubular member 10 serves as a pivot axis for the latch 8 and its ends extend into oppositely disposed longitudinal slots 29 provided in the tubular member 11. The slots 29 permit longitudinal displacement of the two tubular members 10 and 11 when in the decoupled state, and when subjected to rotational motion, tubular member 11 is caused to rotate together with tubular member 10. Thus, the pin 14 is transmitting the movement of selecting a gear ratio from the tubular member 10 to the tubular member 11. The latch 8 is provided with a recess 30 for accommodating the drive pin 15. Furthermore, latch 8 is provided with a bearing surface 33 for pin 15 and with end surfaces 34 and 35 serving as stop means so as to prevent the tubular member 11 from dropping out of the tubular casing 5. In the cover 20 of the tubular casing there are recesses 38 and 37 which serve as locking means for the cams 19 of latch 8. In order that the recesses can be put into alignment with respect to the cam 19, the cover is adjustably mounted to the tubular casing 5, which may be accomplished, for instance, by providing the cover with longitudinal slots for the mounting screws. The cover 20 may also be fashioned so as to allow the recesses to be adjusted individually.

When shifting into second or fourth gear, the cam 19 of latch 8 will move along cover 20, which will cause the drive pin 15, as it is urged by the leg spring 17 against the upper end of the transversely disposed slot 24, to be moved to the left by the recess 30 of the latch. The two tubular members 10 and 11 are in form-locking engagement with one another by way of latch 8 and the drive pin 15. Just before the cam 19 is approaching the depression 37, the second or fourth gear is being engaged, and the decoupling device assumes the position illustrated in FIG. 2. If the members 10, 11 are now subjected to shocks or vibrations, the cam 19 will drop into the depression of the cover 20, as illustrated in FIG. 4, and the tubular member 10 is displaced over a distance indicated in the drawings by the letter A. The latch which is subjected to the force of spring 16, will now be moved upwardly, and will release the drive pin 15. This will cause the tubular members 10, 11 to be decoupled from one another and permit the tubular member 11 to move to and fro without effecting the tubular member 10. This will cause the pin to move in the slot 29 and the drive pin 15 to move along the surface 33 of the latch 8. Due to the length of the slot 29 and the end surfaces 34, 35, the extent of forward and backward movements is limited to a predetermined distance so as to prevent the tubular member 10 from slipping out of the tubular member 11. When the transmission is being shifted out of the second or fourth gear, the tubular member 10 as well as pin 14 disposed on the latch 8 will be pulled to the right, causing the cam 19 to be moved out of the depression 37 and the latch 8 to drop downwardly. The drive pin 15 will then be pushed downwardly in opposition to the force exerted by the leg spring 17 if it is not positioned exactly below the recess 30 and permitted to engage therewith. Due to the resilient yielding movement by the drive pin 15, the latch 8 is prevented from being jammed. As soon as the recess 30 is moved into the proximity of the drive pin 15 during the forward and backward movement of the tubular member 11, the drive pin is caused to move into its locking position, and the two tubular members are coupled together again, as illustrated in FIG. 2. The same sequence of steps occurs when shifting into the first, third, fifth or reverse gears, except that the cam 19' is sliding into the depression 38 which, for geometrical reason, is not quite as deep. The radial dimensions of the depressions may be such that the linkage is not being decoupled when the transmission has been shifted into certain gears, such as the reverse gear, because in some gears gear-jumping is not really a problem.

The arrangement may also be such that the cam 19 engages with the depression 37 at the end of the gear selecting movement. In this instance, the decoupling is effected immediately at the end of the gear selecting movement and not only at the time when the linkage is subjected to vibrations. In the decoupled state there must exist, in the extreme a play of ±12 mm for the tubular member 11 in order to keep the gearshift lever 1 quiet, but it has been demonstrated in tests that even with smaller plays gear-jumping is eliminated.

In order to reduce contact pressure during gear-shifting, the drive pin 15 may also be of square rather than circular cross section.

Depending on the magnitude of movement by the tubular members 10, 11 during shifting, the magnitude of vibrations or shaking movements and the auxiliary movement A (see FIGS. 2 and 4) by the gearshift lever 1, the recess 30 may be made wider than the drive pin 15. The end surfaces 34 and 35 or the longitudinal slot 29, when spaced at a suitable distance from one another and dimensioned at a suitable length, respectively, will also serve as a means to take the tubular member 11 of the gearshift linkage or the drive pin 15 along, i.e., to carry out the gearshift movement if the drive pin 15 were to be placed to the left of the recess 30 while the linkage is in the decoupled state according to FIG. 4.

However, due to the elastic insert in the universal joint 9, the drive pin 15 in FIG. 4 will be positioned to the right of the recess 30 when the linkage is in the decoupled state.

Figure 5:
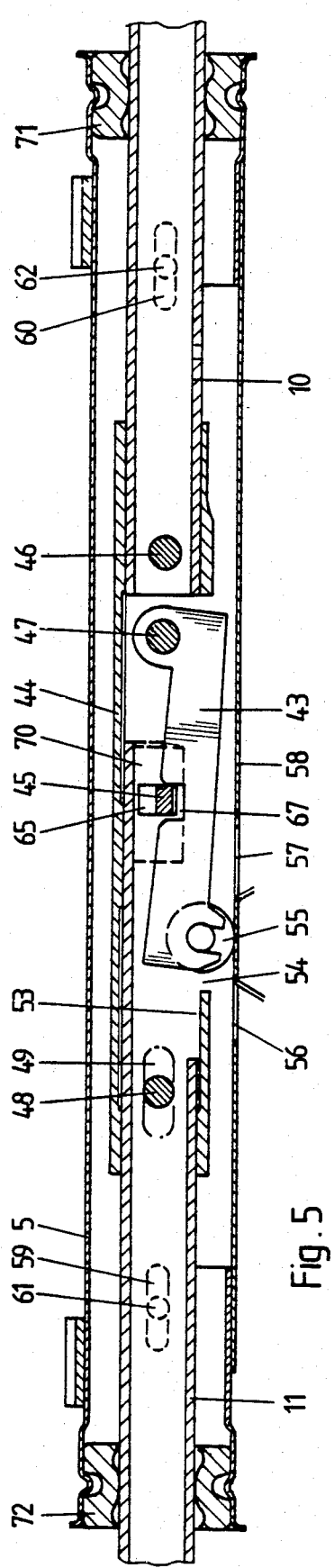
FIG. 5 is a longitudinal sectional view of another embodiment of the decoupling device in the coupled position.
Figure 6:
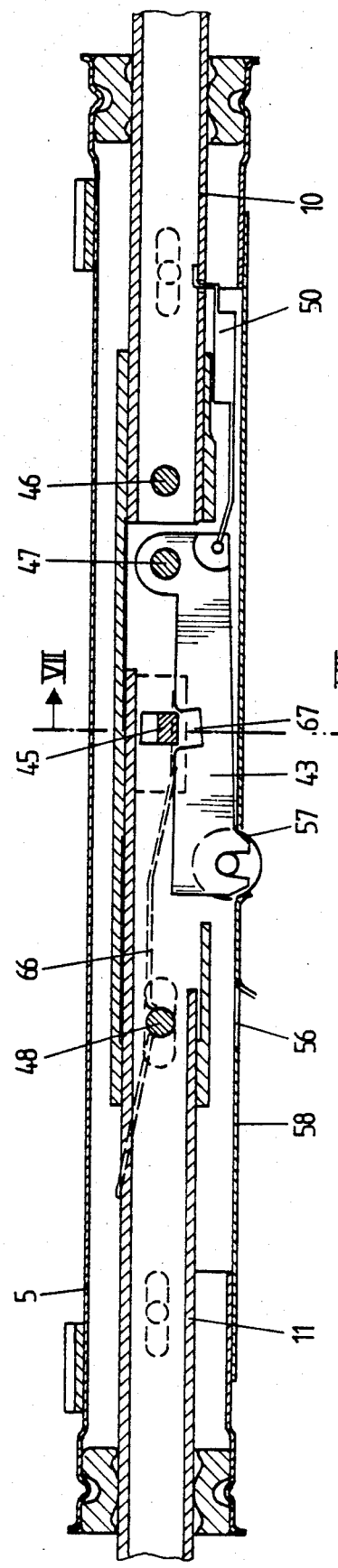
FIG. 6 is the decoupling device according to FIG. 5 in the decoupled position.
Figure 7:
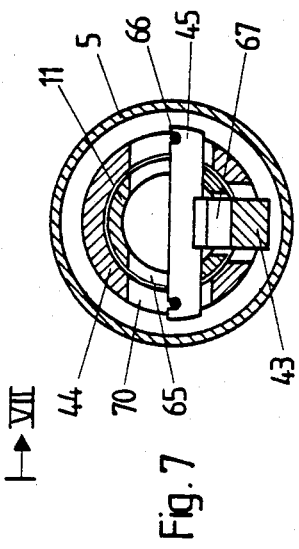
FIG. 7 is a sectional view along line VII—VII of FIG. 6.

The decoupling device according to FIG. 5 to FIG. 7 differs from the one according to FIG. 2 to FIG. 4 essentially in that the latch 43 is accommodated in a tubular coupling member 44, and in that the drive pin 45 is disposed on the upper side of the latch 43. By placing a coupling member 44 between the tubular members 10 and 11, said members may be of the same diameter, and the radial enlargement 18 on the member 11 according to FIG. 2 is not necessary. The tubular member 10 is rigidly connected with the coupling member 44 by way of a pin 46, and the latch 43 is mounted inside said coupling member 44 by means of a pin 47. The end of tubular member 11 is axially displaceable inside the coupling member 44, and a pin 48 attached to the tubular member 11 is engaging in longitudinal slots 49 of the coupling member 44 so that, when selecting a gear, the rotary movement of the coupling member 44 is transmitted to the tubular member 11. An aperture 53 is provided in tubular member 11 and another aperture 54 in the tubular coupling 44 so that the latch 43 can extend into the tubular casing 5. A cam roller 55 is provided at the free end of latch 43 which, by way of the force exerted by spring 50 attached to the tubular member 10 and to the latch 43, is adapted to engage into apertures 56 and 57 provided in the cover 58 of the tubular casing 5. The cover 58 is also provided with oblong apertures 59 and 60 for the fastening screws to be threaded into tapped holes of the tubular casing 5, so that the holes 56 and 57 may be aligned in accordance with the relative position of the roller 55 of latch 43. The drive pin 45 is of rectangular cross section to minimize contact pressure and is slidably mounted in a transversely disposed slot 65 of the tubular member 11. A leg spring 66, which is braced against the tubular member 11 and positioned about the pin 48, is urging the drive pin 45 against the lower end of the transversely disposed slot 65, so that the drive pin 45 will be located in the recess 67 of latch 43 when the roller 55 is resting on the tubular casing 5, FIG. 5. The ends of the drive pin 45 are extending into windows provided in the tubular coupling member 44. These windows also serve to limit the forward and backward movement of the pin 45. The tubular members 10 and 11 are supported by plastic bushings which are inserted in both ends of the tubular casing 5.

The method of operation of the embodiment according to FIGS. 5 to 7 is the same as the one according to FIGS. 2 to 4. In FIG. 5, the tubular members 10 and 11 are coupled to one another by means of the latch 43 and the drive pin 45. If, however, the roller 55 of latch 43 is engaging with the aperture 57 of the cover, as illustrated in FIG. 6, the drive pin 45 is free to move forward and backward on the upper side of the latch 43 (decoupled state). The extent of forward and backward travel by the drive pin 45 and thus the tubular member 11 is determined by the length of the slot 49 in the tubular coupling member 44. The length of the slot 49 is dimensioned so as to permit the tubular member 11 sufficient longitudinal displacement.

Instead of the drive pin 45 according to FIG. 5, a second latch 77 may be provided which is subjected to the force exerted by the tension spring 78 attached to the tubular member 11 and which engages into a recess 80 of latch 43, as apparent from FIG. 8. The latch 77 is extending through an upper opening 81 of the tubular coupling member 44. The pin 48 attached to the tubular member 11 extends into the longitudinal slots 49 provided in the tubular coupling member 44 and also serves as a support for the latch 77. The pins 46 and 47 are combined into one pin 79 which not only establishes the connection between the tubular members 10 and the tubular coupling 44, but which also serves as a support for the latch 43 which is biased by the force exerted by spring 50.

It is apparent from FIG. 9 that the two latches 43 and 77 may be provided with toothing 82 and 83, respectively, so that, for instance, a tooth 83 provided on latch 77 may engage with toothing 82 provided on latch 43. This type of toothing arrangement would permit the tubular members 10 and 11 of the gearshift linkage to be coupled to one another at various distances. Naturally, both the latch 43 and the latch 77 may be provided with a plurality of teeth, and the teeth may be provided, e.g., with straight flanks, so that when subjected to axial forces, no vertical force component will be generated, as would be the case with oblique tooth flanks.

Figure 10:
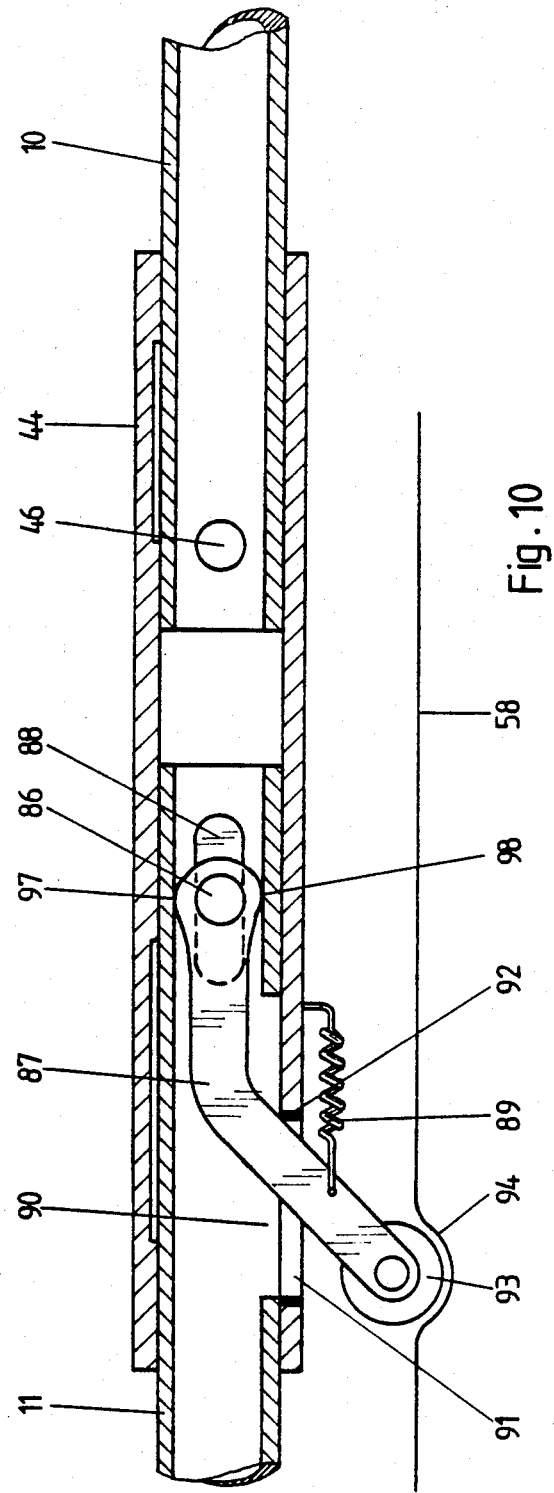
FIG. 10 is a longitudinal cross-sectional view of a further embodiment of the decoupling device, the decoupling device being provided with a latch for effecting a force-locking connection.
Figure 11:
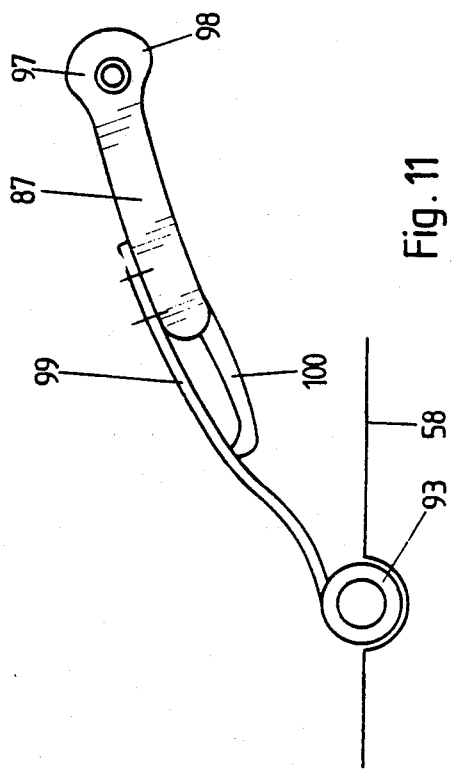
FIG. 11 is a view of a latch with a spring-loaded roller.

A decoupling device incorporating a force-locking connection between the tubular members 10 and 11 of the gearshift linkage is illustrated in FIGS. 10 and 11. Here, the tubular member 10 and the tubular coupling member 44 are rigidly connected to one another by means of a pin 46. A pin 86 is attached to the tubular coupling member 44 for supporting the latch 87 inside the tubular member 11. The ends of said pin 86 engage into longitudinal slots 88 of the tubular member 11 so that when selecting a gear, the tubular members 10 and 11 are caused to turn in unison. The latch 87 is biased by a tension spring 89 attached to the tubular coupling member 44 and extends through apertures 90 and 91 provided in the tubular member 11 and the tubular coupling 44 into the tubular casing 5. The aperture 91 is provided with an end surface 92 for the latch 87. A cam or roller 93 is provided on the free end of the latch 87 for engagement with depressions or apertures 94 of the cover 58, whereas cams 97 and 98 are provided on the other end of the latch 87, which will be wedged inside the tubular member 11 when the roller 93 is resting on the cover 58, whereby a rigid connection is established between the tubular coupling 44 and the tubular member 11. Once the roller 93 has moved into the depression 94, the cams 97 and 98 will release the tubular member 11 which is then free for axial forward and backward movement, the extent of which being determined by the length of slot 88.

In order to compensate for tolerances and to limit the degree of friction generated between the cams 97 and 98, it is advantageous to place the roller 93 on the free end of a leaf spring 99 attached to the latch 87, with the leaf spring being preloaded and resting on the upwardly directed end of an extension 100 of the latch 87. When the roller 93 is moving out of the depression 94, the leaf spring 99 will be raised up somewhat from the extension 100 so as to prevent the cams 97 and 98 from being blocked.

Figure 12:
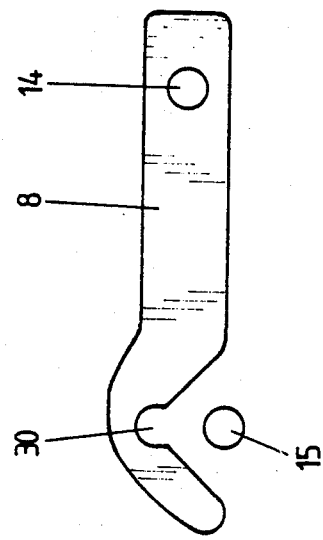
FIG. 12 is a view of a latch provided with a conical recess for the drive pin.

FIG. 12 illustrates an arrangement similar to the one in FIGS. 2 to 4, except that here the recess 30 of the latch is of a downwardly enlarging conical shape in order to trap in all instances the drive pin 15, which is here rigidly attached to the tubular member 11 of the gearshift linkage. Thus, the drive pin 15 need not be resiliently mounted.

In the embodiment according to FIGS. 13 and 14, the drive pin 105 is attached to the latch 106 and engages with a catch means 107 which, for this purpose, is provided with a downwardly enlarging conical recess 108. The catch means 107 is attached to the end of the tubular member 11 of the gearshift linkage by means of a pin 109, whose ends are engaging with slots 110 of the tubular coupling member 44 accommodating the latch 106 and the catch means 107, so as to permit simultaneous rotary movement of the two tubular members 10 and 11 of the gearshift linkage when a gear is being selected. The latch 106 is pivotally mounted by means of the pin 114 disposed in the tubular coupling member 44 and is urged downwardly by a leg spring 115 into the depressions 37 and 38 of the cover 20 for the tubular casing. The end of the tubular member 10 of the gearshift linkage is attached to the tubular coupling 44 by means of the pin 46. As soon as the roller 116 of latch 106, which is positioned on the cover 20, is occupying one of the depressions 37 and 38, the two tubular members 10 and 11 will be decoupled, and the tubular member is permitted to move backward and forward without transmitting such movement to the tubular member 10.

The basic concept of the present invention may also be applied with advantage to other arrangements that have the objective of providing, by relatively simple means, a disengageable coupling between two rods in order to isolate the backward and forward movement of the one rod, so that such movement is not being transmitted to the other rod as would be the case with a rigid connection. The present invention has been described in the foregoing text and by way of the drawings in conjunction with several exemplary embodiments that are based on the objective of installing the novel decoupling device into the gearshift linkage of a motor vehicle. However, the basic concept of the invention is not limited to the embodiments illustrated in the drawings, because a great variety of modifications are possible in terms of design and arrangement of the individual components of the decoupling device without departing from the general overall concept of the invention.

The embodiments of the invention in which an exclusive property or privilege is claimed are defined as follows:

1. Connecting elements for gearshift linkages, especially gearshift linkages disposed between the transmission and the gearshift lever of a motor vehicle, in the form of a decoupling device located in a tubular casing and between two gearshift rods and adapted to permit, after the transmission has been shifted into any of the gears, forward and backward movement of the decoupled gearshift rod, the improvement comprising: the operative connection between the ends of the gearshift rods in engagement with one another being by way of a pivotable spring-biased latch, said latch being pivotally mounted at the end of the gearshift rod connected with the gearshift lever and being operatively associated with a drive pin mounted on the end of the other gearshift rod; and a cam adapted to engage into recesses provided on the casing surrounding the gearshift rods.

2. Connecting elements according to claim 1, the improvement comprising: the gearshift rods being in the form of tubular members whose ends are in telescopic engagement with one another, and a pin being attached to one tubular member for supporting the latch, said pin engaging with its ends into oppositely disposed axially extending slots provided on the other tubular member, so that in the process of selecting a gear, both tubular members are permitted to turn in unison.

3. Connecting elements according to claim 2, the improvement comprising: the one tubular member being provided with a radially enlarged portion to accommodate the insertion of the other tubular member.

4. Connecting elements according to claim 1, the improvement comprising: the drive pin being mounted for sliding movement in a slot extending transversely of the longitudinal axis of the tubular member, and being retained by a spring in its initial position.

5. Connecting elements according to claim 4, the improvement comprising: the spring for the drive pin being in the form of a leg spring which is supported by a pin fastened to the outer tubular member.

6. Connecting elements according to claim 1, the improvement comprising: the latch being provided with a contact surface having the stops and one recess for the drive pin.

7. Connecting elements according to claim 2, the improvement comprising: cavities for the cam of the latch being formed into an adjustable cover secured to the casing.

8. Connecting elements according to claim 7, the improvement comprising: the latch being rotatably mounted in a tubular coupling member disposed between and operatively connecting the ends of the tubular members of the gearshift linkage, and extending into the tubular casing through an opening of the tubular member and an opening of the tubular coupling member.

9. Connecting elements according to claim 8, the improvement comprising: tne tubular coupling member being rigidly connected, preferably by way of a pin, with the end of the one tubular member of the gearshift linkage, and the end of the other tubular member being slidably supported in the tubular coupling member and being provided with a transversely extending slot for the drive pin cooperating with the latch.

10. Connecting elements according to claim 9, the improvement comprising: the ends of the drive pin extending through windows provided in the coupling member.

11. Connecting elements according to claim 8, the improvement comprising: the latch being provided with a recess for the drive pin and at its free end with said cam which is adapted for engagement into holes of the cover for the tubular casing.

12. Connecting elements according to claim 8, the improvement comprising: oppositely disposed longitudinal slots being provided in the tubular coupling member for receiving the ends of a pin fastened to the end of the one tubular member of the gearshift linkage so that during shifting both tubular gearshift members are able to turn in unison.

13. Connecting elements according to claim 8, the improvement comprising, fastening means for fixing the cover to the tubular casing engaging in oblong apertures to permit alignment of the arresting apertures for the cam of the latch.

14. Connecting elements according to claim 8, the improvement comprising: the ends of the casing being provided with bushing inserts made of plastics, or the like, for supporting the tubular gearshift members.

15. Connecting elements according to claim 8, the improvement comprising: a pair of spring-loaded latches being provided at the end of the tubular gearshift members, respectively, both latches being disposed in the tubular coupling member receiving the ends of the tubular members and cooperating with one another.

16. Connecting elements according to claim 15, the improvement comprising: the first latch being pivotally mounted on a pin which also serves to connect one end of one of said tubular members of the gearshift linkage with the tubular coupling and which is provided with a recess for arresting the second latch.

17. Connecting elements according to claim 16, the improvement comprising: a pin being attached to the end of the other of said tubular gearshift member so as to serve as a support for the second latch, and its ends extending into oppositely disposed oblong apertures of the coupling member, so that during gear shifting both tubular gearshift members are caused to rotate in unison.

18. Connecting elements according to claim 16, the improvement comprising: the first latch being provided with toothing for engagement with a single tooth on the second latch.

19. Connecting elements according to claim 8, the improvement comprising: the spring-loaded latch being pivotally mounted in the tubular coupling member and in the tubular gearshift member, said latch, furthermore, extending into the casing through apertures provided in the tubular gearshift member and in the tubular coupling member, and being provided with a cam member for wedging said latch into the tubular gearshift member so as to establish a force-locking connection between the two tubular gearshift members.

20. Connecting elements according to claim 19, the improvement comprising: a pin for journalling the latch being secured to the tubular coupling, and extending through oblong slots provided in one of the tubular gearshift members.

21. Connecting elements according to claim 19, the improvement comprising: a stop means being inserted or formed in the aperture in the tubular coupling for the portion of the latch extending through the opening.

22. Connecting elements according to claim 19, the improvement comprising: the latch being provided at its end extending into the tubular casing with the cam in the form of a resiliently mounted roller, which is adapted to engage into recesses provided in the adjustable cover of the tubular casing.

23. Connecting elements according to claim 19, the improvement comprising: a leaf spring being attached to the latch and being biased by way of engaging a projection provided on the latch, and the free end of spring carrying said cam.

24. Connecting elements according to claim 1, the improvement comprising: the latch having a recess portion for engaging the drive pin which is conically enlarged.

25. Connecting elements according to claim 8, the improvement comprising: the drive pin being secured to the latch and engaging into a conically enlarged recess provided in a catch means disposed at the end of one of the tubular gearshift members.

26. Connecting elements according to claim 25, the improvement comprising: the catch means being secured to the end of the one tubular gearshift member by way of a pin whose ends are extending into the elongated slots of the tubular coupling member accommodating the latch and the catch means, so as to permit simultaneous rotary movement of the two tubular gearshift members when changing gears.

27. A linkage for use in shifting a power gear transmission comprising: a shift lever; an input link connected to said shift lever including a pivotally mounted axially extending latch member; an output link extending coaxial with said input link and including connecting means adapted to engage with said latch member; spring means for pivoting said latch member to disengage said connecting means during gear engagement to permit relative axial movement between said links; housing means enclosing an axially extending portion of said input link; and cam means coacting between said latch member and said housing means for counteracting said spring means to enforce connection of said latch member and said connecting means when said input link is moved axially relative to said housing means to provide unitary axial movement of said input and output links during gear ratio changes.

* * * * *